Figure 1:
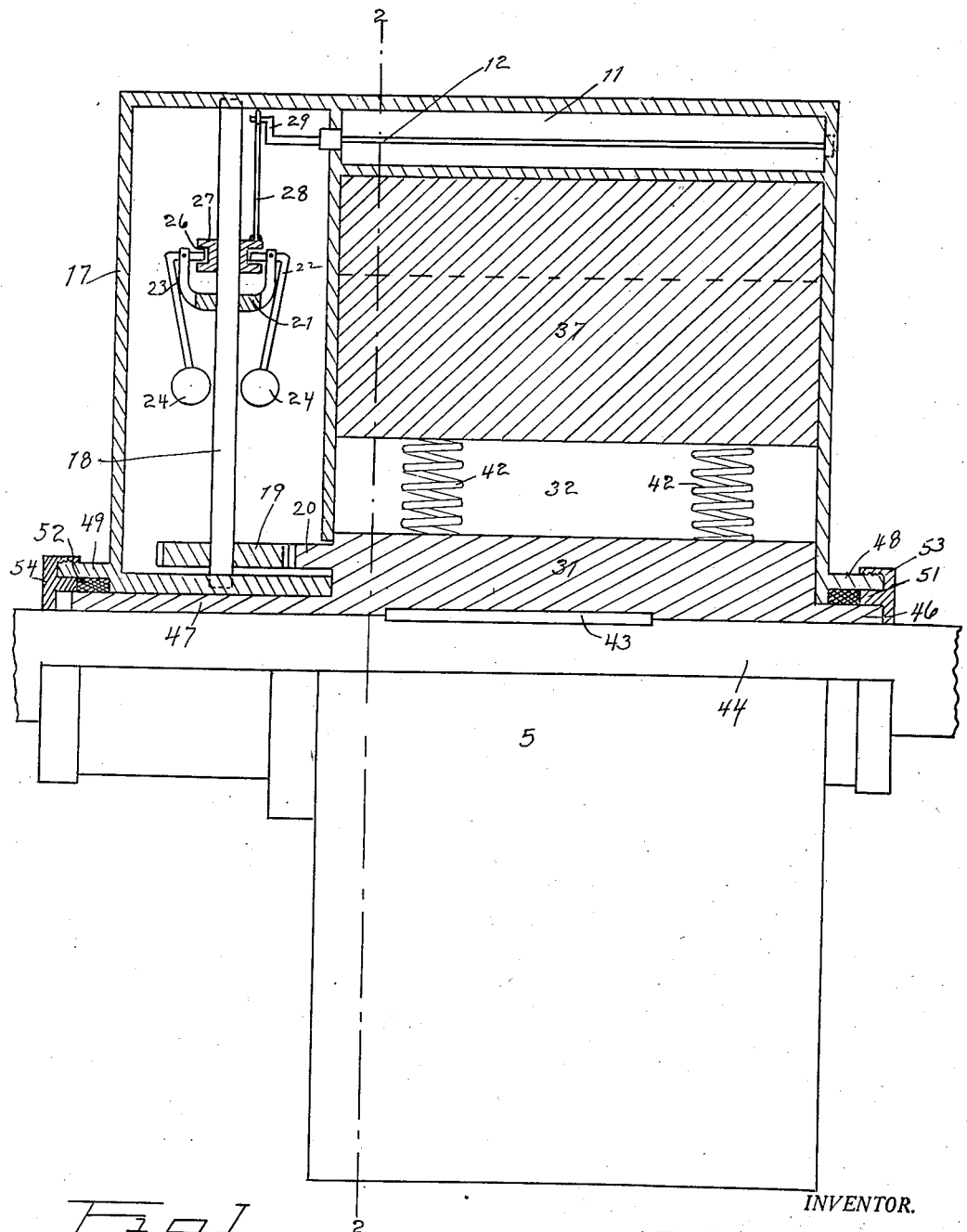

March 17. 1925.

L. T. HARRIGAN 1,529,886

HYDRAULIC BRAKE FOR AUTOMOBILES

Filed Nov. 9, 1923

2 Sheets-Sheet 1

INVENTOR.

LON T. HARRIGAN

BY Victor J. Evans

ATTORNEY.

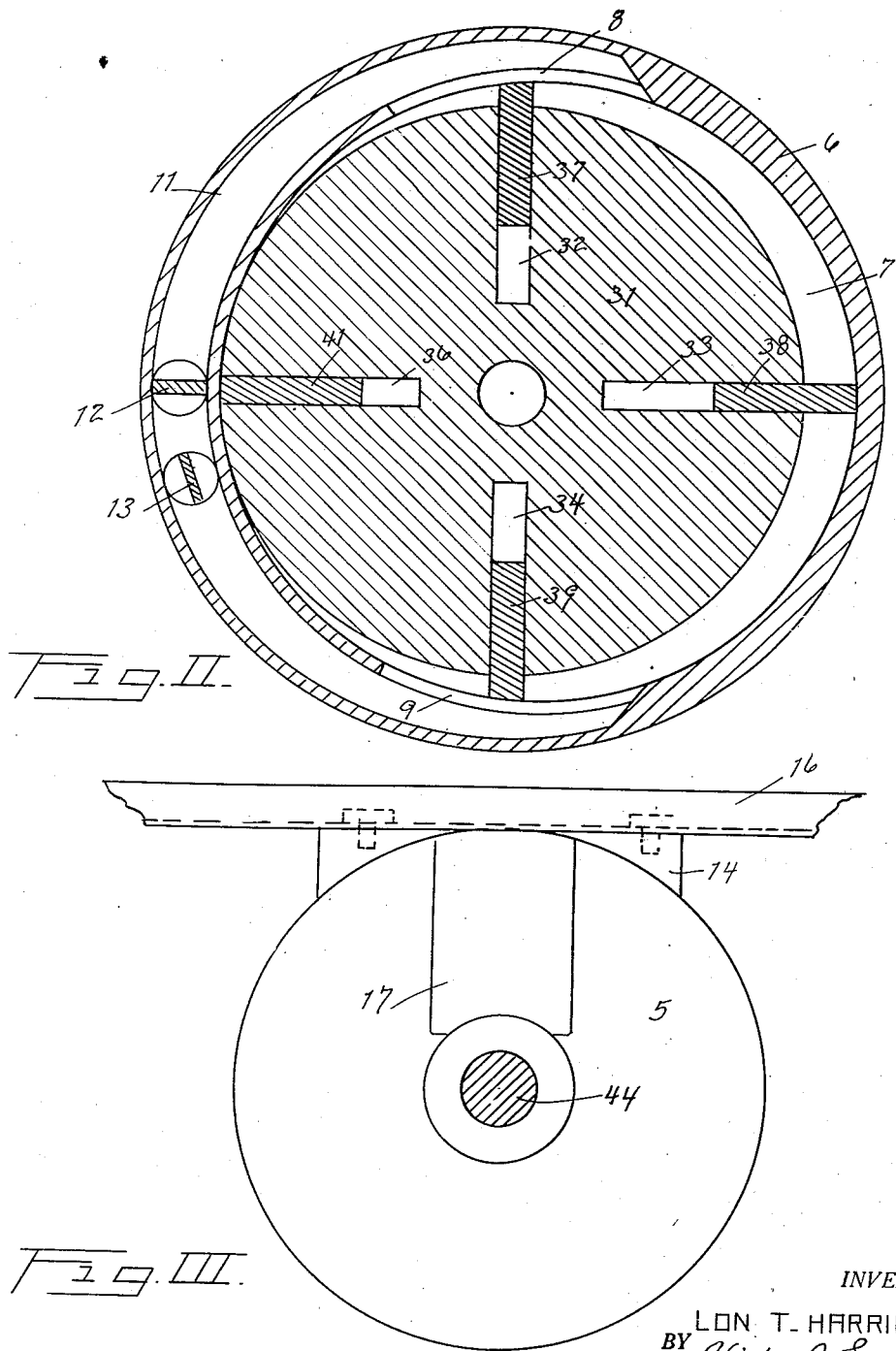

Patented Mar. 17, 1925.

1,529,886

UNITED STATES PATENT OFFICE.

LON T. HARRIGAN, OF LOS ANGELES, CALIFORNIA, ASSIGNOR OF SEVENTY-NINE ONE-HUNDREDTHS TO I. R. LANDIS AND JACOB J. LEONHARDT.

HYDRAULIC BRAKE FOR AUTOMOBILES.

Application filed November 9, 1923. Serial No. 673,862.

*To all whom it may concern:*

Be it known that I, LON T. HARRIGAN, a citizen of the United States, residing at Los Angeles, in the county of Los Angeles and State of California, have invented new and useful Improvements in Hydraulic Brakes for Automobiles, of which the following is a specification.

This invention relates to improvements in hydraulic brake for automobiles, the principal object of which is to provide means mounted upon the propeller shaft of a vehicle or like device for controlling the speed of a rotary shaft.

Another object is to produce a device of this character which is extremely simple and cheap to manufacture and one which may be applied without altering the construction of the device to which the same is attached.

A still further object is to provide means whereby a braking action may be mechanically or manually governed.

Other objects and advantages will be apparent during the course of the following description.

In the accompanying drawings forming a part of this specification, and in which like numerals are employed to designate like parts throughout the same, Figure 1 is a side elevation of my device partly in cross section for the purpose of illustrating the interior mechanism thereof, Figure 2 is a cross section taken on the line 2—2 of Figure 1, and Figure 3 is an end elevation of my device as applied to the frame of a vehicle and the propeller shaft thereof.

Applicant is aware of the fact that many forms of governing devices have been made. These, however in most instances, consisted of friction brakes which due to the rapid wear of the brake linings resulted in constant repair and expense incident thereto. Applicant has overcome this wearing by the utilization of a liquid, taking into fact the non-compressibility of a liquid.

In the accompanying drawings wherein for the purpose of illustration is shown a preferred embodiment of my invention, the numeral 5 designates a casing having an offset circular chamber 7. Ports 8 and 9 connect the chamber 7 with a communicating passage 11, within which passage are located rotary valves 12 and 13. The rotary valve 12 being controlled by a governor while the valve 13 is manually controlled.

The casing 5 is provided with an offset 14 for the purpose of forming a fastening means in order that the device may be attached to a suitable support, as for instance the cross piece 16 of an automobile. A radially disposed housing 17 is formed upon one end of the casing 5 and serves to enclose a shaft 18 having a gear 19 keyed to one end thereof. This gear 19 meshes with a gear 20 formed upon the side of the rotor 31. This shaft 18 carries a yoke 21, the ends of which yoke pivotally support bell crank arms 22 and 23 having the customary weights 24 secured thereto.

The offset end of these bell crank arms are positioned between the recess 26 of a sliding collar 27, which collar is freely rotatable upon the shaft 18 and is provided with a link 28, which link is in turn connected to the crank arm 29 of the valve 12. At 31, I have shown a rotor provided with radial slots 32, 33, 34 and 36, within which are positioned vanes as shown at 37, 38, 39 and 41, respectively.

These vanes are normally held against the interior of the casing 5 by springs 42 (see Figure 1). This rotor is keyed as by a key 43 to the propeller shaft 44 of the vehicle upon which the same is attached.

By viewing Figure 1, it will be noted that this rotor is provided with hub portions 46 and 47, while the casing 5 is also provided with hub portions as shown at 48 and 49. The purpose of which is to provide for packing spaces 51 and 52, so that packing nuts 53 and 54, respectively, can be screwed on the hubs 48 and 49, thus making a tight joint between the rotor and the casing.

The operation of my device is as follows:—

Assuming that the parts are arranged as shown in the figures and that the device is attached to a motor vehicle, rotation of the shaft 44 will impart rotation to the rotor 31, the ends being held in contact with the interior of the casing, will successively move in and out of their respective slots due to the fact that the rotor is off center with respect to the center of the chamber 7. If the direction of rotation is counter clockwise any fluid within the device will be engaged by the vanes and be forced around the chamber out of the port 8, through the passage 11, past the valves 12 and 13 (that is assuming that they are both open) and will again enter the chamber through the port 9. At the same time the rotation of the rotor will impart rotation to the gear 19 through its engagement with the gear 20 of the rotor, thus bringing into action the governor. This governing action is well known and needs no further description.

After the speed exceeds a predetermined amount, the governing action will force the collar 27 downwardly thus operating the valve 12 and moving the same to the position shown in Figure 2. Should the driver of the vehicle, however, desire to check the speed of the same, he may operate the manually controlled valve 13 which will also check the rate of passage of fluid through the passage 11.

It is of course understood, that as soon as this passage is closed or retracted the fluid cannot escape by any other means as the fluid is non-compressible and braking action will be exerted against the vanes, which braking action will also be transmitted to the rotor and to the propeller shaft.

It will thus be seen that I have devised a brake which performs all the functions above set forth.

It is to be understood that the form of my invention herewith shown and described is to be taken as a preferred example of the same and that various changes in the shape, size and arrangement of parts may be resorted to without departing from the spirit of the invention or the scope of the subjoined claims.

Having thus described my invention, I claim:—

1. In a device of the character described, a casing, a chamber eccentrically formed within said casing, a passage formed about one side of said chamber, ports connecting said passage with said chamber, a rotor positioned within said chamber, a gear formed on said rotor, a shaft radially positioned with respect to said rotor, a gear mounted on said shaft and adapted to mesh with the gear on said rotor, a ball governor mounted on said shaft, a valve positioned within said passage, a link connecting said valve and said ball governor, and vanes slidably positioned within said rotor and adapted to contact the side wall of said chamber for the purpose specified.

2. In a device of the character described, a casing, a chamber eccentrically formed within said casing, a passage formed about one side of said chamber, ports connecting said passage with said chamber, a rotor positioned within said chamber, a gear formed on said rotor, a shaft radially positioned with respect to said rotor, a gear mounted on said shaft and adapted to mesh with the gear on said rotor, a ball governor mounted on said shaft, a valve positioned within said passage, a link connecting said valve and said ball governor, vanes slidably positioned within said rotor and adapted to contact the side wall of said chamber, and a manually controlled valve positioned in said passage adjacent said first mentioned valve.

In testimony whereof I affix my signature.

LON T. HARRIGAN.